US008065591B2

(12) United States Patent
Maillet et al.

(10) Patent No.: US 8,065,591 B2
(45) Date of Patent: Nov. 22, 2011

(54) METHOD OF TRANSMITTING DIGITAL DATA PACKETS AND DEVICE IMPLEMENTING THE METHOD AND RECEIVER

(75) Inventors: Arnaud Maillet, Rennes (FR); Mary-Luc Champel, Marpire (FR); Stéphane Fillod, Rennes (FR); Laurent Marie, Chartres de Bretagne (FR)

(73) Assignee: Thomson Licensing, Boulogne-Billancourt (FR)

( * ) Notice: Subject to any disclaimer, the term of this patent is extended or adjusted under 35 U.S.C. 154(b) by 1170 days.

(21) Appl. No.: 11/579,238

(22) PCT Filed: Apr. 19, 2005

(86) PCT No.: PCT/EP2005/051706
§ 371 (c)(1),
(2), (4) Date: Oct. 30, 2006

(87) PCT Pub. No.: WO2005/107123
PCT Pub. Date: Nov. 10, 2005

(65) Prior Publication Data
US 2008/0250299 A1    Oct. 9, 2008

(30) Foreign Application Priority Data
Apr. 29, 2004  (FR) .................................... 04 04595

(51) Int. Cl.
*H03M 13/00* (2006.01)
(52) U.S. Cl. ....................................... 714/774; 714/755

(58) Field of Classification Search .................. 714/755, 714/774, 784
See application file for complete search history.

(56) References Cited

U.S. PATENT DOCUMENTS

| 6,681,362 | B1* | 1/2004 | Abbott et al. ................. 714/755 |
| 7,747,930 | B2* | 6/2010 | Pekonen et al. .............. 714/784 |
| 7,751,324 | B2* | 7/2010 | Vadakital et al. ............. 370/231 |
| 2005/0053285 | A1* | 3/2005 | Linkewitsch ................. 382/232 |

FOREIGN PATENT DOCUMENTS
EP    0642228    3/1995

OTHER PUBLICATIONS

Pro-MPEG Forum: "Pro-MPEG Code of Practice #3", Apr. 3, 2003, Retrieved from the Internet, pp. 1-17.
J. Rosenberg; Dynamicsoft; H. Schulzrinne; Columbia University: "An RTP Payload Format for Generic Forward Error Correction" Request for Comments RFC, No. RFC2733, Dec. 1999, Internet Engineering Task Force, Internet Society, Geneva, Switzerland, pp. 1-27.
Search Report Dated Jul. 4, 2005.

* cited by examiner

*Primary Examiner* — Sam Rizk
(74) *Attorney, Agent, or Firm* — Robert D. Shedd; Paul P. Kiel

(57) ABSTRACT

The invention relates to a method of transmitting digital data packets protected by error correction packets and more precisely the manner of inserting these correction packets into the data packet stream so as to increase the correction effectiveness of the error correction method while limiting the latency introduced into the transmission. The packets are set out in matrix form, error packets are computed on lines and columns and are inserted regularly into the stream at a sufficient distance from the data packets that they protect.

9 Claims, 7 Drawing Sheets

| 0 | 1 | 2 | 3 | FEC 0 |
|---|---|---|---|---|
| 4 | 5 | 6 | 7 | FEC 1 |
| 8 | 9 | 10 | 11 | FEC 2 |
| 12 | 13 | 14 | 15 | FEC 3 |
| 16 | 17 | 18 | 19 | FEC 4 |
| FEC0 | FEC1 | FEC2 | FEC3 | |
| 20 | 21 | 22 | 23 | FEC 5 |
| 24 | 25 | 26 | 27 | FEC 6 |
| 28 | 29 | 30 | 31 | FEC 7 |
| 32 | 33 | 34 | 35 | FEC 8 |
| 36 | 37 | 38 | 39 | FEC 9 |
| FEC4 | FEC5 | FEC6 | FEC7 | |

Fig. 2

| 0 | 1 | 2,FEC0 | 3 | FEC 0 |
|---|---|---|---|---|
| 4 | 5 | 6 | 7,FEC1 | FEC 1 |
| 8 | 9 | 10 | 11 | FEC 2 |
| 12,FEC2 | 13 | 14 | 15 | FEC 3 |
| 16 | 17,FEC3 | 18 | 19 | FEC 4 |
| 20 | 21 | 22,FEC4 | 23 | FEC 5 |
| 24 | 25 | 26 | 27,FEC5 | FEC 6 |
| 28 | 29 | 30 | 31 | FEC 7 |
| 32,FEC6 | 33 | 34 | 35 | FEC 8 |
| 36 | 37,FEC7 | 38 | 39 | FEC 9 |

Fig. 3

| | | | | |
|---|---|---|---|---|
| 0 | 1 | 2 | 3 | FEC 0 |
| 4 | 5 | 6 | 7 | FEC 1 |
| 8 | 9 | 10 | 11 | FEC 2 |
| 12 | 13 | 14 | 15 | FEC 3 |
| 16 | 17 | 18 | 19 | FEC 4 |
| 20,FEC0 | 21 | 22 | 23,FEC1 | FEC 5 |
| 24 | 25 | 26,FEC2 | 27 | FEC 6 |
| 28 | 29,FEC3 | 30 | 31 | FEC 7 |
| 32 | 33 | 34 | 35 | FEC 8 |
| 36 | 37 | 38 | 39 | FEC 9 |

Fig. 4

| 0 | 1 | 2 | 3 | FEC 0 |
|---|---|---|---|---|
| 4 | 5 | 6 | 7 | FEC 1 |
| 8 | 9 | 10 | 11 | FEC 2 |
| 12 | 13 | 14 | 15 | FEC 3 |
| 16 | 17 | 18 | 19 | FEC 4 |
| 20 | 21 | 22 | 23 | FEC 5, FEC0 |
| 24 | 25 | 26, FEC1 | 27 | FEC 6 |
| 28 | 29, FEC2 | 30 | 31 | FEC 7 |
| 32, FEC3 | 33 | 34 | 35 | FEC 8 |
| 36 | 37 | 38 | 39 | FEC 9 |
| 40 | 41 | 42 | 43 | FEC 10, FEC 4 |
| 44 | 45 | 46, FEC5 | 47 | FEC 11 |
| 48 | 49, FEC6 | 50 | 51 | FEC 12 |
| 52, FEC7 | 53 | 54 | 55 | FEC 13 |
| 56 | 57 | 58 | 59 | FEC 14 |
| 60 | 61 | 62 | 63 | FEC 15, FEC 8 |
| 64 | 65 | 66, FEC9 | 67 | FEC 16 |
| 68 | 69, FEC10 | 70 | 71 | FEC 17 |

Fig. 8

| | | | |
|---|---|---|---|
| 0 | 1 | 2 | 3 |
| 4 | 5 | 6 | 7 |
| 8 | 9 | 10 | 11 |
| 12 | 13 | 14 | 15 |
| 16, FEC'0 | 17 | 18 | 19 |
| 20, FEC'1 | 21 | 22 | 23 | FEC0 |
| 24, FEC'2 | 25 | 26, FEC1 | 27 |
| 28, FEC'3 | 29, FEC2 | 30 | 31 |
| 32, FEC3, FEC'4 | 33 | 34 | 35 |
| 36, FEC'5 | 37 | 38 | 39 |
| 40, FEC'6 | 41 | 42 | 43 | FEC4 |
| 44, FEC'7 | 45 | 46, FEC5 | 47 |
| 48, FEC'8 | 49, FEC6 | 50 | 51 |
| 52, FEC7, FEC'9 | 53 | 54 | 55 |
| 56, FEC'10 | 57 | 58 | 59 |
| 60, FEC'11 | 61 | 62 | 63 | FEC8 |
| 64, FEC'12 | 65 | 66, FEC9 | 67 |
| 68, FEC'13 | 69, FEC10 | 70 | 71 |

Fig. 9

METHOD OF TRANSMITTING DIGITAL DATA PACKETS AND DEVICE IMPLEMENTING THE METHOD AND RECEIVER

This application claims the benefit, under 35 U.S.C. §365 of International Application PCT/EP2005/051706, filed on Apr. 19, 2005, which was published in accordance with PCT Article 21(2) on Nov. 10, 2005 in English and which claims the benefit of French patent application No. 0404595, filed on Apr. 29, 2004.

The present invention relates to error correction in the context of sending digital data in packet form and more precisely the manner of sending the correction packets in the data packet stream.

When digital data are sent over a network in data packet form, transmission errors may affect the packets. The networks allowing the transfer of digital data in packet form have specific characteristics, such as bandwidth, latency or reliability, which vary from one type of network to another. Depending on the type of network, there is a noticeably different sensitivity to different types of errors likely to occur during the transmission of packet data over this network. Amongst the types of errors likely to occur are the transmission of a packet with an errored bit, the random loss of a packet, the loss of a series of adjacent packets, the duplication of a packet or of a series of packets.

To counter these errors, two types of methods conventionally exist. On the one hand there are the error detection methods, which are used to detect whether a transmitted packet is errored and to ignore it. Usually these methods are used when the transmission protocol is used to request a resending of the lost packet. Here, mention can be made of the CRC (Cyclic Redundancy Check) and the TCP (Transfer Control Protocol) protocol over IP type networks. On the other hand, there are methods which are used, not only to detect an errored packet, but also to reconstruct it. These methods are known by the acronym FEC (Forward Error Correction) and are well suited to protocols in which the request to resend an errored data packet is not possible. Here, mention can be made of the real time multimedia content transmission protocols in which compliance with real time is incompatible with resending the errored packets. The RTP (Real Time Protocol) protocol corresponds to the latter case.

The general operating principle of the FEC methods is the application of a function, for example an XOR, on all the data packets. The result of this function gives a packet, called the correction packet, which is transmitted in addition to the data packets that have been used to generate it. When a packet is found to be errored, the correction packet, associated with the correctly transmitted packets, is used to reconstruct the errored packet. But this method has limitations in the sense that there are errors that cannot be corrected. Specifically, if two packets are errored in the set of packets that have been used to generate a correction packet by the XOR function, the latter will not be sufficient to reconstruct the two errored packets. The strategy used in the choice of the packets used to generate the correction packet is therefore crucial to the effectiveness of the correction method. In particular, this strategy will depend on the type of errors occurring most frequently on the type of network used. For example, the computation of the correction function on N contiguous packets will be used to correct random errors that are not too numerous but will be powerless in the face of a series of lost packets. To counter the series of lost packets, it is known practice, for example in the document "Code of Practice" of the Pro-MPEG forum, to compute the correction function on a set of D packets taken periodically every L packets. The function is applied to packets $i$, $i+L$, $i+2L$, ..., $i+(D-1)L$. In this manner a series of errored packets of up to L contiguous packets may be corrected by the method.

An improvement to this method, assuming that the data packets are set out in a matrix of D lines and L columns, consists in applying the function to the lines and to the columns of that matrix. A diagram of this known method is given in FIG. 1. In this case, the function is applied not only to the packets $i$, $i+L$, $i+2L$, ..., $i+(D-1)L$, but also to the packets $i$, $i+1$, $i+2$, ..., $i+L-1$. In this manner, each data packet is used to compute two correction packets, and the correction rate in the presence of random errors increases significantly while retaining good correction of the series of errored packets.

An extension of this method consists in allowing the definition of a second line length L', L' being a divisor of L*D or 0, and applying the correction function to lines of length L' instead of L to obtain the line correction packets. A length L' equal to 0 means that no line correction is made but only a column correction. In this manner, a number $D'=L*D/L'$ line correction packets is generated for L*D data packets.

In a known manner, the error correction packets are computed by accumulation in a register of the contribution of each packet contributing to its computation. The transmission in the error packet stream is then carried out just after the last packet used to compute it is sent.

The transmission of these correction packets in the stream as soon as they are computed shows itself to have a negative influence on the correction capability of the method. Specifically, the transmission of data correction packets in the stream has the following consequences:

It uses up bandwidth allocated to the data.
  It affects the regularity of transmission of the data packets, particularly when sending several correction packets to follow.
  The computation of the correction packets at the source may require the temporary storage of the data and introduce latency at the source.
  The computation of the lost packets at the destination may require the temporary storage of the data and introduce latency at the destination.
  This may affect the correction capability of the method particularly when there is the loss of a series of consecutive packets containing data packets and the correction packet protecting them.

The invention uses a clever choice of the sequencing of the correction packets in the stream to increase the correction capabilities of the method while limiting the impact on the latency of the data transfer of this sequencing.

The invention relates to a method of transmitting a stream of digital data packets comprising a step of protecting the said data packets with error correction packets computed by the application of a correction function on lines and columns of these data packets set out in matrix fashion, the lines and columns being defined by the index of the first packet, an incremental offset and the total number of packets comprising them. The method also comprises a step of inserting the said error correction packets into the data packet stream. The method is characterized in that at least certain error correction packets are inserted into the stream at chosen locations and not following the last data packet used to compute them.

According to a particular embodiment of the invention, the error correction packets computed on a line of data packets with consecutive indices are inserted into the data packet stream following the last data packet of the line that they protect.

According to a particular embodiment of the invention, the error correction packets computed on the columns of a data packet matrix are all inserted into the data packet stream sequentially at least after the last data packet of the matrix.

According to a particular embodiment of the invention, the correction packets computed on the columns of a data packet matrix are inserted into the data packet stream regularly amongst the data packets of the matrix that they protect.

According to a particular embodiment of the invention, the correction packets computed on the columns of a data packet matrix are inserted into the data packet stream regularly amongst the data packets of the matrix following that which they protect.

According to a particular embodiment of the invention, the basic indices of the data packets marking the first data packets forming the columns on which the column error correction packets are computed do not follow sequentially, the said columns forming a so-called non-rectangular matrix, the said column correction packets are inserted into the data packet stream so that there is at least a number of packets equal to the length chosen for the matrix line minus one between the last data packet and the column correction packet that protects them.

According to a particular embodiment of the invention, the basic indices of the data packets marking the first data packets forming the columns on which the column error correction packets are computed do not follow sequentially, the said columns forming a so-called non-rectangular matrix, while the offset separating two consecutive packets of a line of data packets used to compute a line correction packet is different from one, forming a nonlinear line, the offset being chosen according to the choice made on the basic indices of the data packets marking the first data packets forming the columns on which the column error correction packets are computed so that these nonlinear lines correspond to the lines of the non-rectangular matrix formed by the columns, the said error correction packets, both line and column, are inserted into the data packet stream so that there is at least a number of packets equal to the length chosen for the matrix line minus one between the last data packet and the correction packet, whether line or column, that protects them.

The invention also relates to a device having digital data packet stream transmission means, means of computing error correction packets by the application of an error correction function on lines and columns of data packets set out in a matrix, characterized in that the device has means for inserting the error correction packets into the data stream so that at least certain error correction packets are inserted into the stream at chosen locations and not following the last data packet used to compute them.

The invention will be better understood and other particular features and advantages will appear on reading the description that follows, the description making reference to the appended drawings in which:

FIG. 2 represents an exemplary sequencing according to the first sequencing method.

FIG. 3 represents an exemplary sequencing according to the second sequencing method.

FIG. 4 represents an exemplary sequencing according to the third sequencing method.

FIG. 8 represents an exemplary sequencing according to the fourth sequencing method.

FIG. 9 represents an exemplary sequencing according to the fifth sequencing method.

The exemplary embodiment of the invention is placed in the context of the real time transfer of digital data over an IP type network. The data are transmitted, in this exemplary embodiment, in the form of a stream via the RTP (Real Time Protocol) protocol. RFC 2733 describes a standard manner of correcting the data packets transmitted by the RTP protocol. This method has been the subject of an extension described in the "Code of Practice" document of the Pro-MPEG forum.

Figure 1:
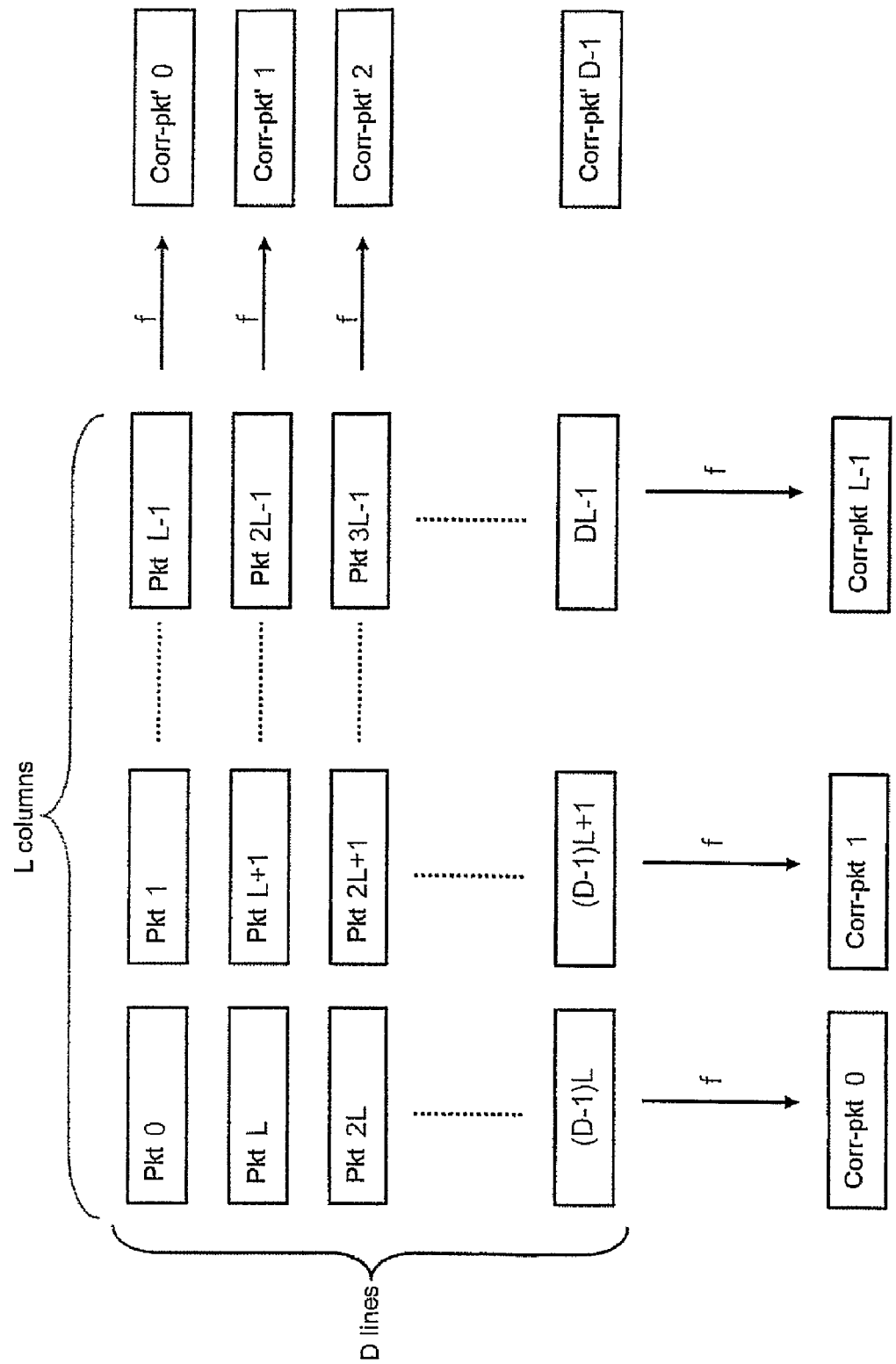
FIG. 1 represents a diagram of the computation of the line and column correction packets in an exemplary embodiment of the invention.

In this exemplary embodiment, the data packets are set out in lines of L packets. Consideration will then be given to matrices of D lines and L packets as can be seen in FIG. 1. L and D are chosen according to the effectiveness that is required. The manner in which these parameters influence the effectiveness of the correction method will be described hereinafter. A correction function is then applied to each column of the matrix. Then a second line length, L', is defined, potentially different from the line length L of the matrix. The only requirement of L' is to be a divisor of L*D or 0. The same correction function is also applied to each sequence of consecutive L' packets of the matrix.

It is also worthwhile to generalize the concept of matrix, initially seen as a rectangular table of D lines and L columns containing the data packets set out consecutively from left to right and from top to bottom. For this purpose, a definition will be given of a matrix concept, called non-rectangular, in which the lines and the columns are defined by a basic index, a number of packets and an incremental offset. Therefore a line or a column of such a non-rectangular matrix will be defined as comprising data packets of index i, i+p, i+2p, i+(n−1)p in which i is the basic index, p is the incremental offset and n the number of packets, this number of packets therefore corresponding to the size of the correction lines L', potentially different from the size of the matrix lines, or to the size of the columns D of the non-rectangular matrix generalizing the rectangular matrix concept.

This correction function may be a XOR, which is the simplest to implement, but other functions are possible such as Reed-Solomon or a Hamming code. These functions are more powerful but more costly in computation. Irrespective of which correction function is chosen, the result of applying this function to a set of packets, a line or a column of the matrix in this instance, is a packet that is called a correction packet. The result of the method is therefore L column correction packets corresponding to applying the function to each column and D' line correction packets corresponding to applying the function to each line. It is also possible to add a correction packet computed by applying the correction function to the correction packets themselves, which adds a second level of protection that is used to correct a loss of a correction packet.

These packets must be transmitted to the destination of the data stream. This transmission may be carried out in several ways. It is possible to transmit these correction packets in the same stream as the data packets, but they are then subject to the same transmission problems as the stream that they protect. They may also be transmitted in a separate stream, which increases resistance to errors.

The method described by the Pro-MPEG forum consists in calculating and sending the correction packets computed based on the columns of the matrix. The method described here, because it sends these same packets, remains compatible with that of Pro-MPEG. Specifically, receiving devices complying with this standard will ignore the correction packets computed on the lines of the matrix and may therefore operate in the same manner with a transmitter according to the invention and with a transmitter according to the Pro-MPEG method.

Figure 5:
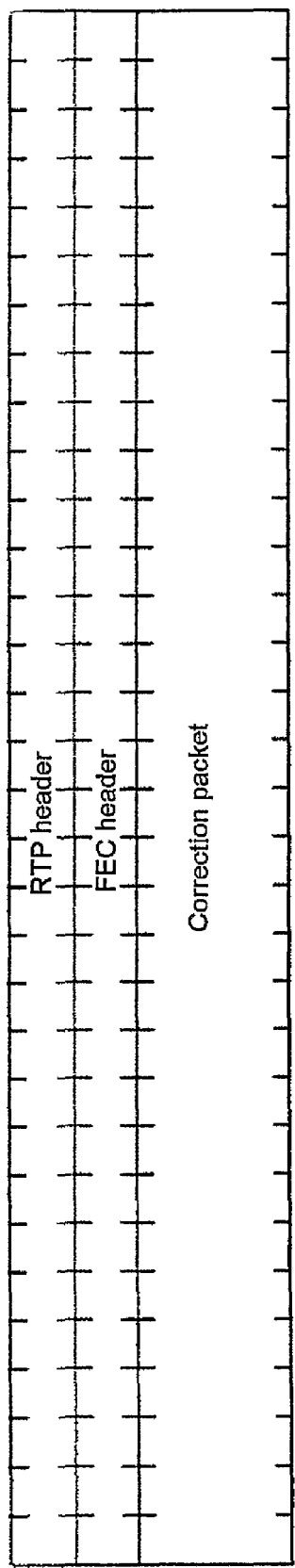
FIG. 5 represents the structure of a correction packet placed in a packet according to the RTP protocol.
Figure 6:
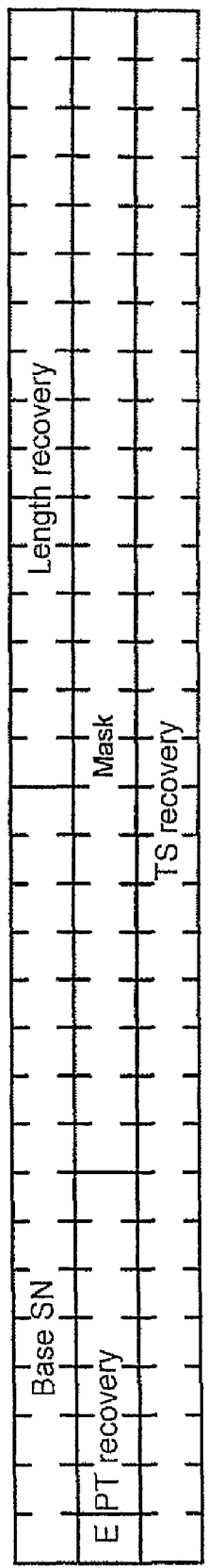
FIG. 6 represents the header of a correction packet according to RFC 2733.

The structure of a packet, as described in RFC 2733, is represented in FIG. 5. It consists in a RTP packet header whose description can be found in RFC 1889. This header is followed by a FEC header then by the correction packet itself. The structure of a FEC header according to RFC 2733 is represented in FIG. 6. This header contains a "base SN" field which contains the lowest sequence number of the set of data packets used to construct the correction packet. The "length recovery" field is used to determine the length of any data packet. It is constructed by applying the correction function to the set formed of the lengths of each data packet. The "E" field is used to indicate a header extension. The "PT recovery" field is obtained by applying the correction function to the data packet "type" field. The "Mask" field is a 24-bit field that is used to determine which data packets are used to construct the correction packet. If bit i is at one, it means that the packets N+i have been used to construct the correction packet. N is the base stored in the "base SN" field. The "TS recovery" field is computed by applying the correction function to the timestamps of the data packets. It is used to reconstruct these timestamps.

Figure 7:
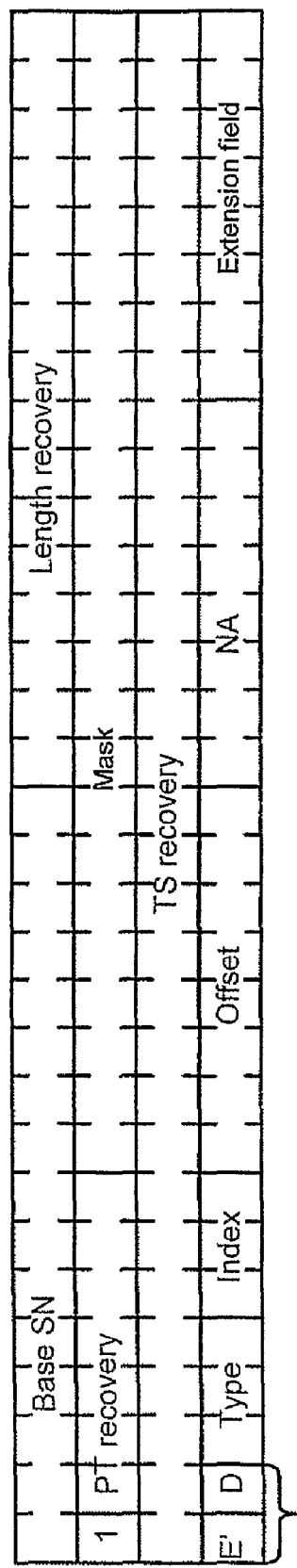
FIG. 7 represents the header of a correction packet according to the exemplary embodiment of the invention described.

It can be seen that, through this mechanism, it is possible only to compute correction packets on sets of a maximum of 24 data packets. To exceed this limit, an extension of this header is defined in the "Code Of Practice" document of the pro-MPEG forum. This extension is represented in FIG. 7. It contains the same header as previously in which the extension field is marked at 1. A new extension field "E" on two bits is added which determines the use of the "extension field" field. The "type" field indicates which correction function is used, 0 for XOR, 1 for a Hamming code, 2 for a Reed/Solomon. The "index" field is used to order the FEC packets in the case where the result of the correction function exceeds the maximum packet size. This may be the case for complex correction functions. The "offset" field determines the period chosen for selecting the data packets; it corresponds to the L parameter of the matrix. The field "NA" (Number of Associated) determines the number of associated data packets for the generation of the correction packet; this number corresponds to the D parameter of the matrix. The "extension field" field is reserved for future uses. The "mask" field has become useless and is initialized by filler octets at 0.

The amendment relative to RFC 2733 consists in separating the "E" field of two bits into a new "E" field on one bit and a "D" field on one bit also which determines whether the correction packet in question is computed on the columns, in which case this "D" field is set at 0. If the correction packet is calculated on a line, this D field is set at 1. It can be seen that with this mechanism, a correction packet computed on a column remains absolutely identical to the same packet computed according to the pro-MPEG forum method, while the additional packets computed on the lines are identifiable by the presence of the D field at 1, which amounts to setting to one the "E" extension field on two bits if the packet is interpreted according to the pro-MPEG method indicating that this packet uses an extension of the format defined by the forum.

When the packets are received, the receiver will restore the received packets in a buffer. The size of this buffer must allow the storage of at least L times D data packets plus the corresponding L plus D' correction packets. The distinction between the data packets and the correction packets is made by the "type" field of the RTP header as described in RFC 1889 describing this protocol. It will be possible to distinguish the data packets from one another thanks to their sequence number and the correction packets from one another thanks to the "base SN" field of their header. Knowledge of the missing packets will then make it possible to attempt their reconstruction by using the correction function and the correction packets. For example, if the correction function used is XOR, it is possible to correct the loss of a data packet in a set of data packets used to generate a correction packet, with the aid of this correction packet. The lines and the columns containing only one lost packet will therefore now be identified in the matrix of received packets to reconstruct them with the corresponding correction packet. The correction may, for example, be carried out by the following method:

Computation of a vector NLi of the number of data packets missing in the line i.

Computation of a vector NCi of the number of data packets missing in the column i.

If a missing packet still remains in the matrix, do the following: ○Find the minimum index p such that NLp=1;

If such a p exists:

Find the index of column q corresponding to the missing packet

Reconstruct the packet of index p and q that is missing by applying the XOR function on the other packets of the line and on the correction packet corresponding to that line NLp=0; NCq=NCq−1;

In the absence of such an index p, find a minimum index q such that NCq=1

If such a q exists: ○Find the index of column p corresponding to the missing packet ○Reconstruct the packet of index p and q that is missing by applying the XOR function on the other packets of the line and on the correction packet corresponding to that column ○NLp=NLp−1; NCq=0;

Otherwise the reconstruction method has failed.

If it succeeds, all the lost packets are reconstructed.

The parameters L, L' and D of the method must be chosen taking account of the following information. First of all, the surplus generated by the correction packets that must be sent in addition to the data packets is 1/L'+1/D, so it can be seen that choosing L' and D to be large will minimize the occupancy of the bandwidth necessary to use the method. Furthermore, the method can be used to correct series of lost packets of up to L+1 contiguous packets, so the bigger L, the more the method will be effective in correcting this type of error. The method is capable of correcting all the random losses of packets up to a number of three lost packets and certain random losses of packets up to a number of D+L−1 lost packets. The symmetry of the problem induces a maximum effectiveness on the random losses of packets when L and D have the same value. Now, the method requires buffers in the devices, whether they be transmitters or receivers, of a minimum size of L*D packets. It can therefore be seen that it is worthwhile choosing values of L' and D to be large to maximize the effectiveness of the method but that this is limited by the size of the transmit and receive buffers of the devices. Another limitation may arise from the time to compute the correction function which may become long for a large number of packets and a choice of a complex function.

Statistical computations are used to compare the effectiveness of this method with that described by the Pro-MPEG forum. It is noted that, as expected, its effectiveness is much greater. For example, by using the XOR correction function and a matrix in which L, L' and D have a value of 6, the method corrects 94.1 percent of the random losses of six data packets whereas the RFC method corrects only 2.4 percent. The method is therefore evidently much more effective for the correction of random losses of data packets in the stream. While the method is capable of correcting all the losses of adjacent packets up to a number of D+1 successive packets while the Pro-MPEG method corrects only up to a number of D. It can therefore be seen that the performance on the loss of adjacent data packets is slightly improved while the performance on random errors is very greatly improved.

Several choices of error correction packet sequencing within the data packet stream and the impact of these choices on the error correction method will now be described.

Take as reference the layout of the data packets in a rectangular matrix of D=5 lines and L'=L=4 columns as illustrated in FIG. 2. In addition, for simplification purposes, the length of the correction line L' will be chosen to be equal to the length of the matrix line L, but the invention extends to any value of L' dividing L*D or 0. The packets FEC'i are computed from data packets of the line i while the packets FECi are computed from the packets of the corresponding column, for example the packet FEC2 is computed from the packets 2, 6, 10, 14 and 18. A conventional sequencing method consists in inserting the correction packets immediately after the last data packet used to compute them. In the example, this conventional sequencing leads to sending the packets in the following order: 0, 1, 2, 3, FEC'0, 4, 5, 6, 7, FEC'1, . . . , FEC'3, 16, FEC0, 17, FEC1, 18, FEC2, 19, FEC3, FEC'4.

The loss of a series of consecutive packets, this series being able to contain data packets and correction packets, can be corrected conditional upon having, for each lost data packet, the column correction packet protecting it. It is then certain that any series of consecutive lost packets containing up to L data packets or column correction packets protecting one of the data packets of the series can be corrected. It will therefore be possible to ensure the correction of any series of packets containing up to L data packets provided that all the column correction packets are inserted into the stream at a distance such that there are at least L−1 packets between the last data packet that it corrects and the insertion point. Note that it is sometimes possible to correct the loss of a series of consecutive packets containing up to 2L packets, but this is not guaranteed.

This sequencing poses the problem of the correction of losses of series of consecutive packets. Specifically, although the loss in series of L consecutive packets can usually be corrected thanks to the column FEC packets, if this occurs for the last line in which the data packets and the column FEC packets are interlaced, this same error will not be correctable.

A first method used to remedy this problem consists in sending all the column FEC packets in series after the transmission of the last line correction packet, FEC'4 in the example. The transmission sequence in the example then becomes: 0, 1, 2, 3, FEC'0, 4, 5, 6, 7, FEC'1, . . . , FEC'3, 16, 17, 18, 19, FEC'4, FEC0, FEC1, FEC2, FEC3.

It is evident therefore that, in this case, it is always possible to correct the loss of a series of packets, data plus FEC, of up to L+1 packets, L data packets and one line correction packet.

On the other hand, this procedure poses the problem that what is being sent is a consecutive series of at least D error correction packets, the last line packet, if it exists, followed by the D column packets. Depending on the size of the matrix, this gives rise to a fairly long time in which no data packet is sent; the regularity in the data transmission is lost.

To counter this problem, a second method consists in storing all the packets of the matrix in a buffer and in computing all the correction packets, whether lines or columns. Then the transmission of the column correction packets may be distributed regularly in the transmission of data packets, for example every N packets, the line correction packets still being sent after transmission of the data packets constituting the line used to compute them. This sequencing is illustrated by FIG. 3 in which the order of transmission of the packets reads from left to right and from top to bottom. When several packets are indicated in one and the same box, they are sent in the order in which they appear. A judicious way of choosing the increment N is to choose N=L/2 if the number of lines D is greater than or equal to the number of columns L and N=D otherwise, but it will appear to those skilled in the art that any other regular distribution of the column correction packets in the matrix has the same properties.

In this manner, the data packet stream is regular, whereas the need to store the packets introduces a latency in the transmission of the packets. In addition, the column correction packets are always sent at a distance less than L−1 packets from one of the packets used to compute them, so this does not benefit from the resistance to loss of a consecutive series of L packets that existed in the first method.

A third method consists in distributing the column correction packets in the next matrix of data packets as illustrated by FIG. 4. One procedure consists in inserting the first column correction packet after the first data packet of the next matrix. This ensures that there will be a distance greater than L−1 from the preceding one. This therefore retains the resistance to loss of series of consecutive packets containing L packets. The correction packets are regularly distributed in the data packet stream. In addition, it is no longer necessary to delay the transmission of the data packets at the source. On the contrary, the data packets of the matrix must be stored at the destination until the last column correction packet has been received for the reconstruction of the lost packets. The method therefore involves a latency at the destination. Here again, it will be evident to those skilled in the art that any other regular distribution of the column correction packets in the next matrix has the same properties.

A fourth method explores the possibility of using non-rectangular matrices. Specifically, the definition of the error correction scheme is based on the computation of error packets defined by three parameters included in the header of these packets. This header is illustrated in FIG. 7. A correction packet is therefore defined by an SN field corresponding to the index of the first data packet used to compute it; an "offset" field determines the period chosen for selecting the data packets; it corresponds to the parameter L of the matrix. The "NA" (Number of Associated) field determines the number of associated data packets for the generation of the correction packet; this number corresponds to the parameter D of the matrix.

Obtaining the rectangular matrix usually used therefore corresponds, for the line correction packets, to using an offset of 1, a number of L', and to incrementing the basic index by L' beginning with the index of the first data packet of the matrix, the column correction packets being obtained by an offset of L, a number of D, and by incrementing the basic index by 1 based on the index of the first data packet of the matrix.

The manner of changing the basic index of the column correction packets is used to define a matrix, called non-rectangular, by changing the 1 increment of the basic index. For example, such a matrix is illustrated in FIG. 8. It can be seen that the line correction packets are still computed in the same manner on a line consisting of L' data packets with consecutive indices. Certain lines therefore contain packets belonging to consecutive non-rectangular matrices. On the other hand, the column correction packets are computed on a column of D packets but the basic indices of two consecutive columns are not sequential and the basic index of the column i+1 minus that of the column i is different from L. In the example given, the packet FEC0 is computed on the data packets 3, 7, 11, 15 and 19, the packet FEC1 is computed on the data packets 6, 10, 14, 18 and 22, the packet FEC2 is computed on the data packets 9, 13, 17, 21 and 25 and the packet FEC3 is computed on the data packets 12, 16, 20, 24 and 28.

A wise, but not necessary, manner of choosing these basic indices of the columns consists in separating the basic indices of two consecutive columns by a distance of D, if L is greater than D and by L−1 otherwise.

The line correction packets are still inserted in the same manner at the end of the line of data packets that they protect. Whereas the column correction packets are inserted at a distance at least equal to L−1 from the last data packet of the column used to compute it; an example is given in FIG. 8.

The advantage of this method is that it maintains a regular stream in which the correction packets are distributed regularly in the stream of data packets. The effectiveness of the correction method is retained in the event of the loss of a series of consecutive packets since the column correction packets are separated by at least L−1 packets from the packets that they protect. Nor is it necessary to store the data packets and delay their transmission at the source. No latency is therefore generated at the source.

The disadvantage of this method is that, at the destination, all the lines containing at least one packet of the non-rectangular matrix must be stored to allow the reconstruction of the lost packets, hence slightly more than the non-rectangular matrix itself.

A fifth method consists in modifying the fourth by changing the line scheme. Nonlinear matrix lines are defined in which the offset is no longer one but depends on the configuration chosen for the columns. If the distance between the basic indices of the columns is L−1, an offset of L−1 will be chosen. In the example illustrated in FIG. 9, the method no longer consists, as the line used to compute the line correction packets, in a line of packets with consecutive indices, but in a diagonal line. This therefore uses the lines and the columns of the data packets of the non-rectangular matrix. In the example in FIG. 9, the packet FEC'0 is computed by using the packets 3, 6, 9 and 12, the packet FEC'1 is computed by using the packets 7, 10, 13 and 16, the packet FEC'2 is computed by using the packets 11, 14, 17 and 20, the packet FEC'3 is computed by using the packets 15, 18, 21 and 24 and the packet FEC'4 is computed by using the packets 19, 22, 25 and 28. The column packets are still computed according to the fourth method. An example of sequencing is indicated in FIG. 9.

Concerning the sequencing, this time the line packets like the column packets are inserted at a distance of at least L−1 packets from the last data packet that they protect. An example is given in FIG. 9.

One advantage of this method is that it allows the reconstruction of the lost packets even when two series of L consecutive packets are lost and even, in some cases, when a series of 2L consecutive packets is lost. Another advantage of this method is that it maintains a regular stream in which the correction packets are distributed regularly in the stream of data packets. The effectiveness of the reconstruction method is retained, whether for the loss of series of consecutive packets or for the loss of isolated packets. The correction packets are computed only on the packets of the current matrix. With respect to latency, this method does not require the storage of the data packets at the source in buffers and therefore introduces no latency at the source.

Figure 10:
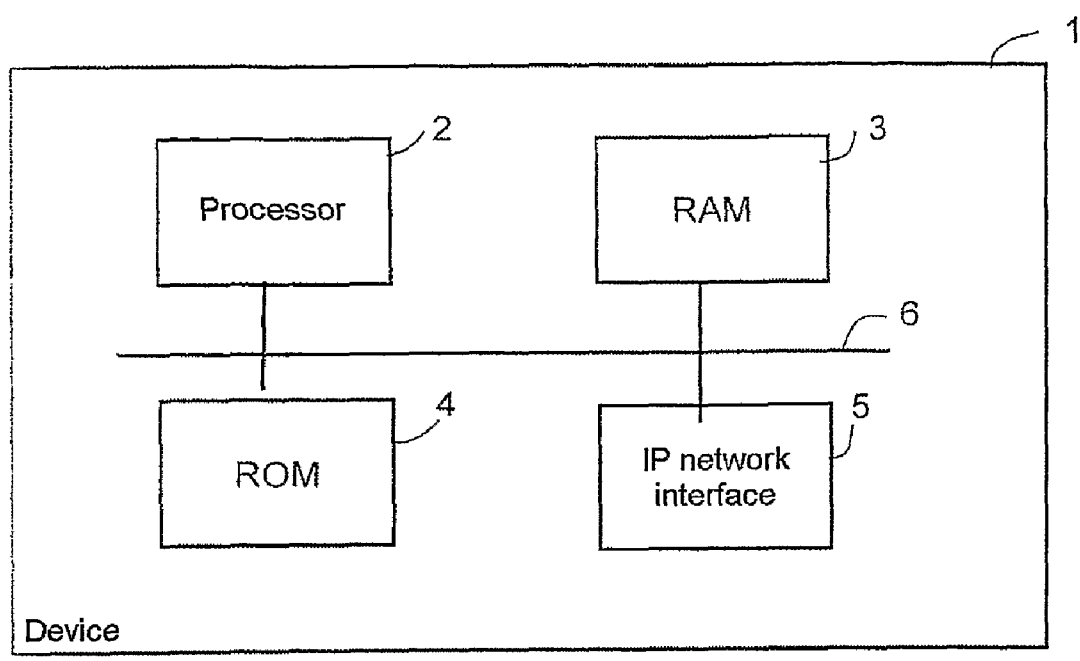
FIG. 10 represents the hardware architecture of a transmitting or receiving device according to the exemplary embodiment of the invention.

FIG. 10 represents the internal architecture of a transmitter or receiver device 1 which has read-only memory (ROM 4) allowing it to store programs and data, random access memory (RAM 3) allowing it to load these programs for the purpose of an execution by the processor 2. This device is connected to an IP-type network via a network interface 5 which allows it to send or receive the digital data packet streams. These components communicate by means of an internal bus 6.

The invention claimed is:

1. A method comprising:
    protecting a stream of digital data packets with error correction packets computed by application of a correction function on lines and columns of the data packets set out in a matrix fashion, the lines and columns being defined by the index of the first packet, an incremental offset and the total number of packets comprising the lines and columns of the data packets; and
    inserting the error correction packets into the data packet stream;
    wherein at least certain error correction packets are inserted into the stream at chosen locations between data packets and not following the last data packet used to compute the at least certain error correction packets.

2. The method according to claim 1, wherein the error correction packets computed on a line of data packets with consecutive indices are inserted into the data packet stream following the last data packet of the line that the error correction packets protect.

3. The method according to claim 2, wherein the error correction packets computed on the columns of a data packet matrix are all inserted into the data packet stream sequentially at least after the last data packet of the matrix.

4. The method according to claim 2, wherein the correction packets computed on the columns of a data packet matrix are inserted into the data packet stream regularly amongst the data packets of the matrix that the error correction packets protect.

5. The method according to claim 2, wherein the correction packets computed on the columns of a data packet matrix are inserted into the data packet stream regularly amongst the data packets of the matrix following that which the error correction packets protect.

6. The method according to claim 2, wherein the basic indices of the data packets marking the first data packets forming the columns on which the column error correction packets are computed do not follow sequentially, the columns forming a non-rectangular matrix, the column correction packets are inserted into the data packet stream so that there is at least a number of packets equal to the length chosen for the matrix line minus one between the last data packet and the column correction packet that protects the lines and columns of the data packets.

7. The method according to claim 1, wherein the basic indices of the data packets marking the first data packets forming the columns on which the column error correction packets are computed do not follow sequentially, the columns forming a non-rectangular matrix, while the offset separating two consecutive packets of a line of data packets used to compute a line correction packet is different from one, forming a nonlinear line, the offset being chosen according to the choice made on the basic indices of the data packets marking the first data packets forming the columns on which the column error correction packets are computed so that these nonlinear lines correspond to the lines of the non-rectangular matrix formed by the columns, the error correction packets, both line and column, are inserted into the data packet stream so that there is at least a number of packets equal to the length chosen for the matrix line minus one between the last data packet and the correction packet, whether line or column, that protects the lines and columns of the data packets.

8. A device comprising:
digital data packet stream transmission means,
means of computing error correction packets by application of an error correction function on lines and columns of data packets set out in a matrix, the lines and columns being defined by the index of the first packet, an incremental offset and the total number of packets comprising the lines and columns of the data packets, and
means for inserting the error correction packets into the data stream so that at least certain error correction packets are inserted into the stream at chosen locations between data packets and not following the last data packet used to compute the at least certain error correction packets.

9. A receiver adapted to receive digital data packet streams wherein digital data packet streams comprise error correction packets computed by application of an error correction function on lines and columns of data packets set out in a matrix, the lines and columns being defined by the index of the first packet, an incremental offset and the total number of packets comprising the lines and columns of the data packets, and
the error correction packets being inserted into the data stream so that at least certain error correction packets are inserted into the stream at chosen locations between data packets and not following the last data packet used to compute the at least certain error correction packets.

* * * * *